June 2, 1942.  A. M. STONER  2,285,101
CHUCK
Filed March 30, 1940
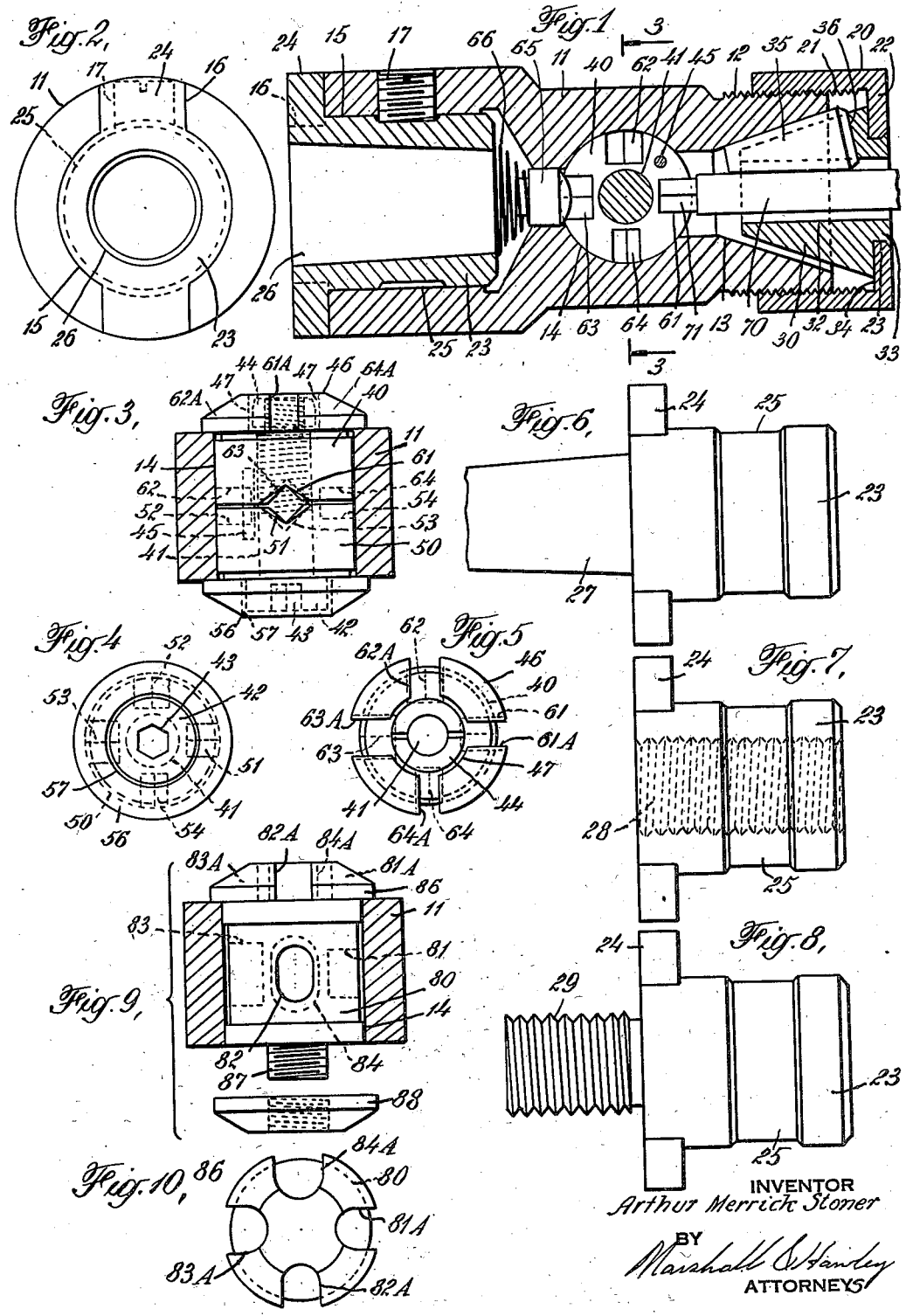
INVENTOR
Arthur Merrick Stoner
BY
Marshall & Hawley
ATTORNEYS Patented June 2, 1942

2,285,101

UNITED STATES PATENT OFFICE 2,285,101

CHUCK

Arthur Merrick Stoner, West Hartford, Conn., assignor to The Jacobs Manufacturing Company, Hartford, Conn., a corporation of Connecticut Application March 30, 1940, Serial No. 326,860

8 Claims. (Cl. 279—14)

This invention relates to improvements in chucks of the type which comprises spaced tapered rollers which are forced inwardly by being moved longitudinally in relation to a surrounding inclined surface.

The difficulty of obtaining a driving grip between a tool and the rollers of such chucks is recognized and in my copending application for patent Serial No. 316,486, filed January 31, 1940, I have shown a chuck of this type in which the tapered rollers are arranged to center the tool and the body of the chuck is constructed with a transverse slot to receive a tang on the gripped end of the tool, whereby it is driven positively. When tools with tangs of different widths are used there is some lost motion between the body of the chuck and the tools with narrower tangs which in some cases is undesirable, especially when the chuck is used with taps with their squared ends inserted in the slots.

It is the purpose of this invention to further improve chucks of this general character and to provide for a closer fit for the positively driven end of the tool and the chuck. For cases in which any back lash is undesirable, as when the chucks are used on a lead screw tapping machine, the driving parts of a chuck made according to the present invention may be clamped onto the tool.

Another feature of this invention is to provide an arrangement for facilitating the connection of the chuck with machine tools of different construction by making it to receive adaptors for conection with different machines.

I will describe my invention in the following specification and point out its novel features in appended claims.

Referring to the drawing, Fig. 1 is a sectional side elevation of a chuck which is made according to and embodies my invention;

Fig. 2 is a rear end view of the chuck shown in Fig. 1;

Fig. 3 is an end view partly in section of some of the parts shown in Fig. 1, the section being taken on the line 3—3 of the latter figure;

Fig. 4 is a front elevation and Fig. 5 a rear elevation of the parts shown in Fig. 3;

Figs. 6, 7 and 8 are elevations of adaptors of different form from the one shown in Fig. 1;

Fig. 9 is a view similar to Fig. 3 illustrating a simplified modification of construction; and Fig. 10 is a rear elevation of the parts shown in Fig. 9.

11 designates the body of the chuck. This has an externally threaded cylindrical portion 12 and an inner conical surface 13.

20 designates a nut having an internally threaded cylindrical portion 21 adapted to fit the portions 12 of the body. 22 designates a flange at the front end of the nut in which is a central orifice 23.

30 designates the roller retainer. This is in the form of a truncated cone of an angularity corresponding with that of the conical surface 13 and has an axial bore 32. 33 designates a boss extending from the larger end of the retainer adapted to fit rotatively in the orifice 23 of the nut. The surface 34 of the retainer is adapted to be seated on the inner surface of the flange of the nut. The outer end of the boss is riveted over the outer end of the flange of the nut to hold these parts together. The retainer is constructed with longitudinally disposed slots to receive tapered rollers 35, the larger end of which abuts beveled surfaces 36 of the retainer.

Back of the conical opening 13 is a transverse bore 14 in which is rotatively supported a tool driving device which comprises two cylindrical members 40 and 50 interconnected by a screw 41 having a head 42 in which is a hexagonal socket 43. This screw passes through a clearance bore through the member 50 and engages internal threads in the member 40. 44 designates a nut having a left hand thread engaging a reduced end portion of the screw 41. A pin 45 interconnects the members 40 and 50 and insures them rotating in unison. The member 40 has a head 46 which overlaps the body 11 of the chuck. 47 designates a pocket which receives the nut 44. The member 50 has a similar head 56 with a pocket 57 which receives the head 42 of the screw.

Notches 61, 62, 63 and 64 of different sizes are cut in the end of member 40 opposite its head and similar notches 51, 52, 53 and 54 are cut in the inner end of member 50, corresponding to and in angular alinement with the notches in the member 40. In angular alinement with these notches are radially disposed slots 61A, 62A, 63A and 64A in the head 46 of widths corresponding to the widths of the notches. These slots have flat parallel sides.

65 designates a button having a rounded end which is pressed by a spring 66 into engagement with the notches 61, 51, etc. This performs the dual function of forming a non-positive stop to hold the opposite notches in alinement with the axis of the chuck body and of moving the members 40 and 50 apart as far as the adjustment of the screw 41 permits.

The rear end of the body 11 is constructed with a cylindrical bore 15 and across the rear end of the body a transverse slot 16 is cut. An adaptor having a cylindrical body 23 and oppositely extending ears 24 fits into the bore 15 and the slot 16. An annular groove 25 is cut in the body 23 intermediate its ends. 17 designates a set screw in the chuck body 11 projecting into this groove 25 to hold the adaptor against longitudinal movement. The adaptor shown in Fig. 1 has a tapered bore 26 adapted to fit a similarly tapered shank of a machine tool.

The adaptor shown in Fig. 6 has a tapered shank 27. That shown in Fig. 7 has an internally threaded bore 28 and the one shown in Fig. 8 has an externally threaded boss 29. Obviously, these adaptors may be interchanged to fix various driving elements of machine tools.

Before describing the modification illustrated in Figs. 9 and 10, I will describe how this chuck is used with a tap having a shank 70 and a square end 71, (Fig. 1).

The squared end 71 is first inserted in that one of the radial slots in the head 46 which fits it best such, for example, as the slot 61A. The members 40 and 41 are then turned to bring the slot 61A into the position where it faces the front of the chuck. This will bring the notches 61, 51 into axial alinement with the chuck body. The button 65 tends to hold the members 40 and 50 in this position and spread them apart, as shown in Fig. 3. The tap will be placed then in the chuck and its squared end will enter the space between the notches 61 and 51. The tap may then be centered by tightening the nut 20 on the chuck body. When used as thus described the members 40 and 50 form means for driving the tap positively.

When desired to eliminate any possible lost motion between the end 71 of the tap and the members 40 and 50, a further tightening operation may be performed by inserting a suitable tool in the opening 43 and turning the screw 41. This will bring the members 40 and 50 together to clamp the end 71 of the tap firmly.

In the modification shown in Figs. 9 and 10, a single cylindrical member 80 is used instead of the two members 40 and 50 previously described. This member is provided with transverse slots 81, 82, 83 and 84 of different widths. It has a head 86 in which are radially disposed slots 81A, 82A, 83A and 84A corresponding in width with the width of the transverse slots 81, 82, 83 and 84. A threaded boss 87 of reduced diameter extends from the end of member 80 opposite its head. This receives a nut 88 to hold the member in the chuck body 11. The operation of this device needs no further description.

Structural modifications have been illustrated and described to show that the invention is not limited to any particular construction and I intend no limitations other than those imposed by the following claims.

What I claim is:

1. In a chuck of the type which comprises a body and elements supported by the body for centering a tool by engaging a shank thereof, a device comprising a pair of cylindrical members rotatable in the body about a transverse axis back of said elements, corresponding radial tool engaging notches of different sizes in the proximate faces of said members, and means adapted to receive a tool for rotating said device to bring said notches into tool engaging position.

2. In a chuck of the type which comprises a body and elements supported by the body for centering a tool by engaging a shank thereof, a device comprising a pair of cylindrical members rotatable in the body about a transverse axis back of said elements, corresponding radial tool engaging notches of different sizes in the proximate faces of said members, means adapted to receive a tool for rotating said device to bring said notches into tool engaging position, and a non-positive stop arranged to hold the device in its adjusted position.

3. In a chuck of the type which comprises a body and elements supported by the body for centering a tool by engaging a shank thereof, a device comprising a pair of cylindrical members rotatable in the body about a transverse axis back of said elements, corresponding radial tool engaging notches of different sizes in the proximate faces of said members, means adapted to receive a tool for rotating said device to bring said notches into tool engaging position, and a non-positive stop arranged to engage said notches to hold the device in its adjusted position.

4. In a chuck of the type which comprises a body and elements supported by the body for centering a tool by engaging a shank thereof, a device comprising a pair of cylindrical members rotatable in the body about a transverse axis back of said elements, corresponding radial tool engaging notches of different sizes in the proximate faces of said members, said device being constructed with a plurality of radially disposed slots outside of said body of widths corresponding to the sizes of said notches whereby the device may be rotated to bring a desired pair of said notches into tool engaging position.

5. In a chuck of the type which comprises a body and elements supported by the body for centering a tool by engaging a shank thereof, a device comprising a pair of cylindrical members rotatable in the body about a transverse axis back of said elements, corresponding radial tool engaging notches of different sizes in the proximate faces of said members, said device being constructed with a plurality of radially disposed slots outside of said body of widths corresponding to the sizes of said notches whereby the device may be rotated to bring a desired pair of said notches into tool engaging position, and a non-positive stop arranged to engage said notches to hold the device in its adjusted positions.

6. In a chuck of the type which comprises a body and elements supported by the body for centering a tool by engaging a shank thereof, a pair of members rotatable in the body about a transverse axis back of said elements, said members having a limited axial relative movement, notches of different sizes in the proximate faces of said members, means for forcing said members toward each other, means adapted to receive a tool for rotating said members in unison to bring any pair of said notches into tool engaging position, a button arranged to be pressed into a pair of said notches other than the pair in tool engaging position arranged to separate the members and to hold them non-positively in their adjusted positions, said device being constructed with a plurality of radially disposed slots outside of said body of widths corresponding to the sizes of said notches whereby the device may be rotated to bring a desired pair of notches into tool engaging position.

7. In a chuck of the type which comprises a body and elements supported by the body for centering a tool by engaging a shank thereof a device comprising, a pair of members rotatable in the body about a transverse axis back of said elements, said members having a limited axial relative movement, corresponding radial tool engaging notches of different sizes in the proximate faces of said members, and means for forcing said members toward each other, and means adapted to receive a tool for rotating said members in unison to bring any pair of said notches into tool engaging position.

8. In a chuck of the type which comprises a body and elements supported by the body for centering a tool by engaging a shank thereof a device comprising, a pair of members rotatable in the body about a transverse axis back of said elements, said members having a limited axial relative movement, corresponding radial tool engaging notches of different sizes in the proximate faces of said members, means for forcing said members toward each other, means adapted to receive a tool for rotating said members in unison to bring any pair of said notches into tool engaging position, and a button arranged to be pressed into a pair of said notches other than the pair in tool engaging position arranged to separate the members and to hold them nonpositively in their adjusted positions.

ARTHUR MERRICK STONER.